(12) United States Patent
Bian

(10) Patent No.: US 11,892,601 B2
(45) Date of Patent: Feb. 6, 2024

(54) CAMERA OPTICAL LENS

(71) Applicant: Changzhou Raytech Optronics Co., Ltd., Changzhou (CN)

(72) Inventor: Xuqi Bian, Shenzhen (CN)

(73) Assignee: Changzhou Raytech Optronics Co., Ltd., Changzhou (CN)

( * ) Notice: Subject to any disclaimer, the term of this patent is extended or adjusted under 35 U.S.C. 154(b) by 451 days.

(21) Appl. No.: 17/134,187

(22) Filed: Dec. 25, 2020

(65) Prior Publication Data
US 2022/0026678 A1    Jan. 27, 2022

(30) Foreign Application Priority Data

Jul. 22, 2020    (CN) .......................... 202010707152.0

(51) Int. Cl.
*G02B 9/60* (2006.01)
*G02B 13/00* (2006.01)

(52) U.S. Cl.
CPC ........... *G02B 13/0045* (2013.01); *G02B 9/60* (2013.01)

(58) Field of Classification Search
CPC .............................. G02B 13/0045; G02B 9/60
See application file for complete search history.

(56) References Cited

U.S. PATENT DOCUMENTS 8,810,921 B1*    8/2014    Tsai ................... G02B 13/0045
                                                                                 348/340

* cited by examiner

*Primary Examiner* — Joseph P Martinez
(74) *Attorney, Agent, or Firm* — W&G Law Group

(57) ABSTRACT

A camera optical lens includes, from an object side to an image side, a first lens having a positive refractive power; a second lens having a positive refractive power; a third lens; a fourth lens having a positive refractive power; and a fifth lens having a negative refractive power, and satisfies: $2.10 \leq f1/f \leq 4.00$; $1.00 \leq d4/d6 \leq 3.00$; $0.20 \leq d8/d9 \leq 0.90$, and where f and f1 respectively denote focal lengths of the camera optical lens and the first lens; d4 denotes an on-axis distance between the second lens and the third lens; d6 denotes an on-axis distance between the third lens and the fourth lens; d8 denotes an on-axis distance between the fourth lens and the fifth lens; and d9 denotes an on-axis thickness of the fifth lens, thereby achieving good optical performance while satisfying design requirements for ultra-thinness, a wide angle and a large aperture.

11 Claims, 7 Drawing Sheets

CAMERA OPTICAL LENS

TECHNICAL FIELD

The present invention relates to the field of optical lens, and more particularly, to a camera optical lens suitable for handheld terminal devices such as smart phones or digital cameras and camera devices such as monitors or PC lenses.

BACKGROUND

In recent years, with the popularity of smart phones, the demand for a miniaturized camera lens has increased. The photosensitive devices of a conventional camera lens are nothing more than charge coupled devices (CCD) or complementary metal-oxide semiconductor devices (CMOS Sensor). With the advancement of semiconductor manufacturing technology, the pixel size of the photosensitive device has become smaller and smaller, and nowadays electronic products are developing with good functions and thin and small appearance. Therefore, the miniaturized camera lens with good imaging quality has become the mainstream in the current market.

In order to obtain a better imaging quality, the camera lens traditionally mounted onto mobile phone cameras mostly adopts a structure including three lenses or four lenses. However, with the development of technology and increased diversified requirements from the users, in the situation where a pixel area of a photosensitive device gradually decreases and the requirement in the imaging quality gradually increases, camera lenses having five lenses have gradually appeared in lens design. Although the conventional camera lens including five lenses has a good optical performance, there is still some irrationality in terms of optical power, a distance between lenses and a shape of the lenses. As a result, the lens structure cannot meet the design requirements of a large aperture, a wide angle and ultra-thinness while having good optical performance.

Therefore, it is necessary to provide a camera optical lens that has good optical performance while meeting the design requirements of a large aperture, a wide angle and ultra-thinness.

SUMMARY

A purpose of the present invention is to provide a camera optical lens, aiming to solve the problems of insufficient large aperture, wide angle and ultra-thinness of the conventional camera optical lens.

A technical solution of the present invention is as follows.

A camera optical lens includes, from an object side to an image side: a first lens having a positive refractive power; a second lens having a positive refractive power; a third lens; a fourth lens having a positive refractive power; and a fifth lens having a negative refractive power, and the camera optical lens satisfies following conditions: $2.10 \leq f1/f \leq 4.00$; $1.00 \leq d4/d6 \leq 3.00$; $0.20 \leq d8/d9 \leq 0.90$, where f denotes a focal length of the camera optical lens; f1 denotes a focal length of the first lens; d4 denotes an on-axis distance from an image side surface of the second lens to an object side surface of the third lens; d6 denotes an on-axis distance from an image side surface of the third lens to an object side surface of the fourth lens; d8 denotes an on-axis distance from an image side surface of the fourth lens to an object side surface of the fifth lens; and d9 denotes an on-axis thickness of the fifth lens.

In an improved embodiment, the camera optical lens further satisfies a following condition: $0.30 \leq R3/R4 \leq 0.80$, where R3 denotes a central curvature radius of an object side surface of the second lens; and R4 denotes a central curvature radius of the image side surface of the second lens.

In an improved embodiment, the camera optical lens further satisfies following conditions: $-20.90 \leq (R1+R2)/(R1-R2) \leq -3.20$; and $0.06 \leq d1/TTL \leq 0.23$, where R1 denotes a central curvature radius of an object side surface of the first lens, R2 denotes a central curvature radius of an image side surface of the first lens, d1 denotes an on-axis thickness of the first lens, and TTL denotes a total optical length from the object side surface of the first lens to an image plane of the camera optical lens along an optic axis.

In an improved embodiment, the camera optical lens further satisfies following conditions: $0.98 \leq f2/f \leq 6.63$; $-12.19 \leq (R3+R4)/(R3-R4) \leq -1.28$; and $0.05 \leq d3/TTL \leq 0.19$, where f2 denotes a focal length of the second lens, R3 denotes a central curvature radius of an object side surface of the second lens, R4 denotes a central curvature radius of the image side surface of the second lens, d3 denotes an on-axis thickness of the second lens, and TTL denotes a total optical length from an object side surface of the first lens to an image plane of the camera optical lens along an optic axis.

In an improved embodiment, the camera optical lens further satisfies following conditions: $-1653.71 \leq f3/f \leq 32.02$; $-41.88 \leq (R5+R6)/(R5-R6) \leq 108.00$; and $0.04 \leq d5/TTL \leq 0.13$, where f3 denotes a focal length of the third lens, R5 denotes a central curvature radius of the object side surface of the third lens, R6 denotes a central curvature radius of the image side surface of the third lens, d5 denotes an on-axis thickness of the third lens, and TTL denotes a total optical length from an object side surface of the first lens to an image plane of the camera optical lens along an optic axis.

In an improved embodiment, the camera optical lens further satisfies following conditions: $0.42 \leq f4/f \leq 1.30$; $0.03 \leq (R7+R8)/(R7-R8) \leq 0.28$; and $0.05 \leq d7/TTL \leq 0.18$, where f4 denotes a focal length of fourth lens, R7 denotes a central curvature radius of the object side surface of the fourth lens, R8 denotes a central curvature radius of the image side surface of the fourth lens, d7 denotes an on-axis thickness of the fourth lens, and TTL denotes a total optical length from an object side surface of the first lens to an image plane of the camera optical lens along an optic axis.

In an improved embodiment, the camera optical lens further satisfies following conditions: $-1.76 \leq f5/f \leq -0.55$; $0.76 \leq (R9+R10)/(R9-R10) \leq 2.48$; and $0.03 \leq d9/TTL \leq 0.14$, where f5 denotes a focal length of the fifth lens, R9 denotes a central curvature radius of the object side surface of the fifth lens, R10 denotes a central curvature radius of an image side surface of the fifth lens, and TTL denotes a total optical length from an object side surface of the first lens to an image plane of the camera optical lens along an optic axis.

In an improved embodiment, the camera optical lens further satisfies a following condition: $TTL/IH \leq 1.81$, where IH denotes an image height of the camera optical lens, and TTL denotes a total optical length from an object side surface of the first lens to an image plane of the camera optical lens along an optic axis.

In an improved embodiment, the camera optical lens further satisfies a following condition: $FOV \geq 76.5°$, where FOV denotes a field of view of the camera optical lens.

In an improved embodiment, the camera optical lens further satisfies a following condition: $FNO \leq 1.15$, where FNO denotes an F number of the camera optical lens.

The present invention has at least the following beneficial effects: the present invention provides a TOF camera optical lens having good optical performance while satisfying design requirements for a wide angle and a large aperture.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present invention. Moreover, in the drawings, like reference numerals designate corresponding parts throughout the several views.

DESCRIPTION OF EMBODIMENTS

The present invention will hereinafter be described in detail with reference to several exemplary embodiments. To make the technical problems to be solved, technical solutions and beneficial effects of the present invention more apparent, the present invention is described in further detail together with the figures and the embodiments. It should be understood the specific embodiments described hereby is only to explain the invention, not intended to limit the invention.

Embodiment 1

Figure 1:
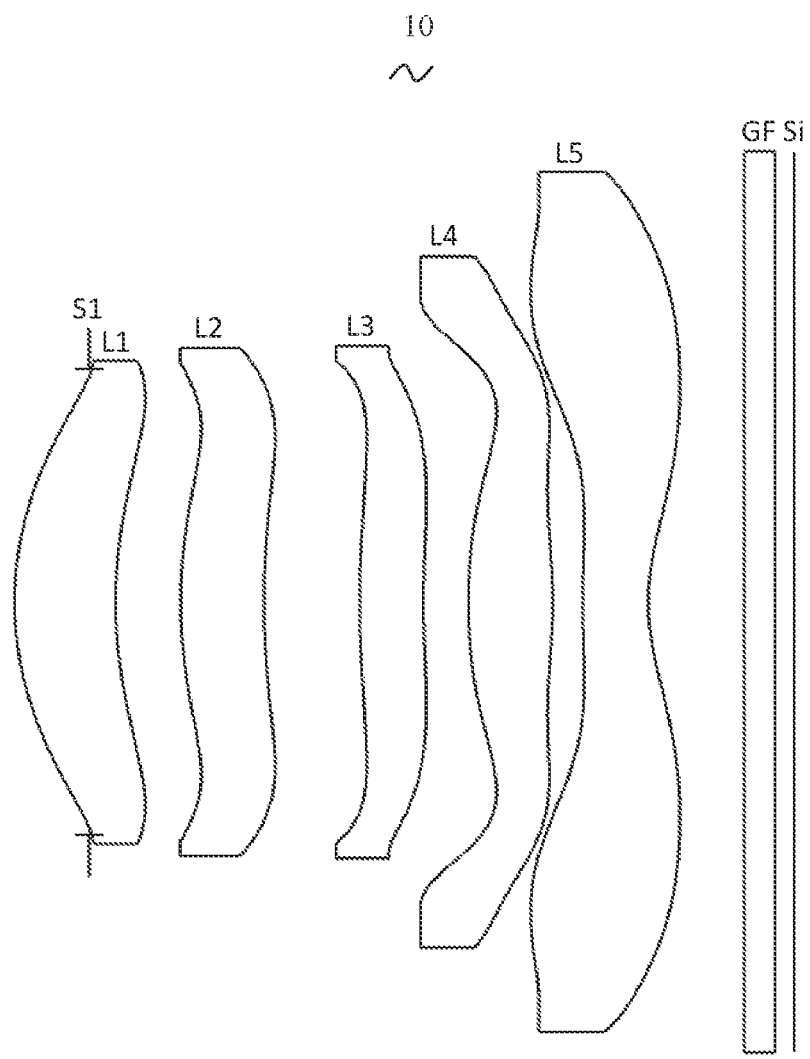
FIG. 1 is a schematic structural diagram of a camera optical lens in accordance with Embodiment 1 of the present invention.

Referring to FIG. 1-4, the present invention provides a camera optical lens 10 in Embodiment 1. In FIG. 1, a left side is an object side, and a right side is an image side. The camera optical lens 10 mainly includes, from an object side to an image side, an aperture S1, a first lens L1, a second lens L2, a third lens L3, a fourth lens L4, and a fifth lens L5. An optical element such as an optical filter (GF) or a glass plate can be arranged between the fifth lens L5 and an image plane Si.

The first lens L1 is made of a plastic material, the second lens L2 is made of a plastic material, the third lens L3 is made of a plastic material, the fourth lens L4 is made of a plastic material, and the fifth lens L5 is made of a plastic material. In other embodiments, the lenses can also be made of other materials.

In this embodiment, the first lens L1 has a positive refractive power, the second lens L2 has a positive refractive power, the third lens L3 has a positive refractive power, the fourth lens L4 has a positive refractive power, and the fifth lens L5 has a negative refractive power.

In this embodiment, a focal length of the camera optical lens 10 is defined as f, a focal length of the first lens L1 is defined as f1, an on-axis distance from an image side surface of the second lens L2 to an object side surface of the third lens L3 is defined as d4, an on-axis distance from an image side surface of the third lens L3 to an object side surface of the fourth lens L4 is defined as d6, an on-axis distance from an image side surface of the fourth lens L4 to an object side surface of the fifth lens L5 is defined as d8, and an on-axis thickness of the fifth lens L5 is defined as d9. The camera optical lens 10 satisfies following conditions:

$$2.10 \leq f1/f \leq 4.00 \qquad (1);$$

$$1.00 \leq d4/d6 \leq 3.00 \qquad (2); \text{ and}$$

$$0.20 \leq d8/d9 \leq 0.90 \qquad (3),$$

where the condition (1) specifies a ratio of the focal length f1 of the first lens L1 to the focal length f of the camera optical lens. This condition facilitates to improve the performance of the optical system.

The condition (2) specifies a position of the third lens L3. This condition facilitates lens installation.

The condition (3), when d8/d9 satisfies the condition, effectively specifies a ratio of a thickness of the fourth lens L4 to an air spacing between the fourth and fifth lenses, reducing aberrations and improving an image quality.

A central curvature radius of the object side surface of the second lens L2 is defined as R3, and a central curvature radius of the image side surface of the second lens L2 is defined as R4. The camera optical lens 10 further satisfies a condition: $0.30 \leq R3/R4 \leq 0.80$, which specifies a shape of the second lens L2. This condition can alleviate deflection of light passing through the lens while effectively reducing aberrations.

The object side surface of the first lens L1 is convex at a paraxial position and an image side surface being concave at a paraxial position.

A central curvature radius of the object side surface of the first lens L1 is defined as R1, and a central curvature radius of the image side surface of the first lens L1 is defined as R2. The camera optical lens 10 further satisfies a condition: $-20.90 \leq (R1+R2)/(R1-R2) \leq -3.20$. This can reasonably control a shape of the first lens L1, so that the first lens L1 can effectively correct spherical aberrations of the system. As an example, $-13.06 \leq (R1+R2)/(R1-R2) \leq -4.00$.

An on-axis thickness of the first lens L1 is defined as d1, and a total optical length from the object side surface of the first lens L1 to an image plane of the camera optical lens along an optic axis is defined as TTL. The camera optical lens 10 further satisfies a condition: $0.06 \leq d1/TTL \leq 0.23$. This condition can facilitate achieving ultra-thin lenses. As an example, $0.10 \leq d1/TTL \leq 0.18$.

In this embodiment, the object side surface of the second lens L2 is convex at a paraxial position and the image side surface of the second lens L2 is concave at a paraxial position.

A focal length of the second lens L2 is defined as f2, and the focal length of the camera optical lens 10 is defined as f. The camera optical lens 10 further satisfies a condition: 0.98≤f2/f≤6.63. This condition controls the positive refractive power of the second lens L2 within a reasonable range, which facilitate correction of aberrations of the optical system. As an example, 1.58≤f2/f≤5.30.

A central curvature radius of the object side surface of the second lens L2 is defined as R3, and a central curvature radius of the image side surface of the second lens L2 is defined as R4. The camera optical lens 10 further satisfies a condition: −12.19≤(R3+R4)/(R3−R4)≤−1.28, which specifies a shape of the second lens L2. This can facilitate correction of an on-axis aberration with the development towards ultra-thinness and a wide angle. As an example, −7.62≤(R3+R4)/(R3−R4)≤−1.60.

An on-axis thickness of the second lens L2 is defined as d3, and the total optical length from the object side surface of the first lens L1 to the image plane of the camera optical lens 10 along an optic axis is defined as TTL. The camera optical lens 10 further satisfies a condition: 0.05≤d3/TTL≤0.19. This can facilitate achieving ultra-thin lenses. As an example, 0.08≤d3/TTL≤0.15.

The object side surface of the third lens L3 is convex at a paraxial position and the image side surface of the third lens L3 is concave at a paraxial position.

The focal length of the camera optical lens 10 is defined as f, and a focal length of the third lens L3 is defined as f3. The camera optical lens 10 further satisfies a condition: −1653.71≤f3/f≤32.02. The appropriate allocation of the refractive power leads to better imaging quality and a lower sensitivity of the system. As an example, −1033.57≤f3/f≤25.61.

A central curvature radius of the object side surface of the third lens L3 is defined as R5, and a central curvature radius of the image side surface of the third lens L3 is defined as R6. The camera optical lens 10 further satisfies a condition: −41.88≤(R5+R6)/(R5−R6)≤108.00, which specifies a shape of the third lens. This condition can alleviate the deflection of light passing through the lens while effectively reducing aberrations. As an example, −26.17≤(R5+R6)/(R5−R6)≤86.40.

An on-axis thickness of the third lens L3 is defined as d5, and the total optical length from the object side surface of the first lens L1 to the image plane of the camera optical lens 10 along an optic axis is defined as TTL. The camera optical lens 10 further satisfies a condition: 0.04≤d5/TTL≤0.13. This can facilitate achieving ultra-thin lenses. As an example, 0.07≤d5/TTL≤0.10.

The object side surface of the fourth lens L4 is convex at a paraxial position and an image side surface of the fourth lens L4 is convex at a paraxial position.

A focal length of the fourth lens L4 is defined as f4, and the focal length of the camera optical lens 10 is defined as f. The camera optical lens 10 further satisfies a condition: 0.42≤f4/f≤1.30, which specifies a ratio of the focal length of the fourth lens L4 to the focal length of the system. This condition facilitates improving the performance of the optical system. As an example, 0.67≤f4/f≤1.04.

A central curvature radius of the object side surface of the fourth lens L4 is defined as R7, and a central curvature radius of the image side surface of the fourth lens L4 is defined as R8. The camera optical lens 10 further satisfies a condition: 0.03≤(R7+R8)/(R7−R8)≤0.28, which specifies a shape of the fourth lens L4. This can facilitate correction of an off-axis aberration with the development towards ultra-thinness and a wide angle. As an example, 0.05≤(R7+R8)/(R7−R8)≤0.22.

An on-axis thickness of the fourth lens L4 is defined as d7, and the total optical length from the object side surface of the first lens L1 to the image plane of the camera optical lens 10 along an optic axis is defined as TTL. The camera optical lens 10 further satisfies a condition: 0.05≤d7/TTL≤0.18. This can facilitate achieving ultra-thin lenses. As an example, 0.09≤d7/TTL≤0.14.

An object side surface of the fifth lens L5 is convex at a paraxial position and an image side surface of the fifth lens L5 if concave at a paraxial position.

A focal length of the fifth lens L5 is defined as f5, and the focal length of the camera optical lens 10 is defined as f. The camera optical lens 10 further satisfies a condition: −1.76≤f5/f≤−0.55. Limitations on the fifth lens L5 can effectively make a light angle of the camera optical lens 10 gentle and reduce the tolerance sensitivity. As an example, −1.10≤f5/f≤−0.69.

A central curvature radius of the object side surface of the fifth lens L5 is defined as R9, and a central curvature radius of the image side surface of the fifth lens L5 is defined as R10. The camera optical lens 10 further satisfies a condition: 0.76≤(R9+R10)/(R9−R10)≤2.48, which specifies a shape of the fifth lens L5. This can facilitate correction of an off-axis aberration with the development towards ultra-thinness and a wide angle. As an example, 1.22≤(R9+R10)/(R9−R10)≤1.99.

An on-axis thickness of the fifth lens L5 is defined as d9, and the total optical length from the object side surface of the first lens L1 to the image plane of the camera optical lens 10 along an optic axis is defined as TTL. The camera optical lens 10 further satisfies a condition: 0.03≤d9/TTL≤0.14. This can facilitate achieving an ultra-thin lens. As an example, 0.05≤d9/TTL≤0.11.

In this embodiment, an F number (FNO) of the camera optical lens 10 is smaller than or equal to 1.15, thereby achieving a large aperture.

In this embodiment, a field of view (FOV) of the camera optical lens 10 is greater than or equal to 76.5°, thereby achieving a wide angle.

In this embodiment, the total optical length from the object side surface of the first lens L1 to the image plane of the camera optical lens 10 along an optic axis is defined as TTL, and the image height of the camera optical lens 10 is defined as IH. The camera optical lens 10 further satisfies a condition: TTL/IH≤1.81, thereby achieving ultra-thinness.

When the focal length of the camera optical lens 10, the focal lengths and the central curvature radii of respective lenses satisfy the above conditions, the camera optical lens 10 will have high optical performance while achieving ultra-thinness, a wide angle and a large aperture; with these characteristics of the camera optical lens 10, the camera optical lens 10 is especially suitable for camera optical lens assembly of mobile phones and WEB camera optical lenses formed by imaging elements such as CCD and CMOS for high pixels.

In addition, the camera optical lens of the present invention is a TOF (Time of flight) receiving terminal lens. A technical principle of the TOF is that a transmitting terminal lens emits an infrared surface light source, which is irradiated on an object and reflected back, and the receiving terminal lens receives the reflected infrared light information. This process realizes a 3D recognition process. A working wavelength range of the camera optical lens of the present invention is 920 nm-960 nm.

It is worth mentioning that since the first lens L1, the second lens L2, the third lens L3, the fourth lens L4, and the fifth lens L5 have the structures and parameter relationships as above, the camera optical lens 10 can reasonably allocate the refractive power, spacing and shapes of the lenses, and thus various aberrations are corrected.

In the following, examples will be used to describe the camera optical lens 10 of the present invention. The symbols recorded in each example will be described as follows. The focal length, on-axis distance, central curvature radius, on-axis thickness, inflection point position, and stagnation point position are all expressed in unit of mm.

TTL: Total optical length (the total optical length from the object side surface of the first lens L1 to the image plane of the camera optical lens along the optic axis) in unit of mm.

F number (FNO): a ratio of an effective focal length of the camera optical lens to an entrance pupil diameter of the camera optical lens.

In addition, at least one of the object side surface and the image side surface of each lens may be provided with an inflection point and/or a stagnation point to meet the requirements of high imaging quality. For specific implementation options, see the description below.

The design data of the camera optical lens 10 shown in FIG. 1 is shown below.

Table 1 lists the central curvature radius of the object side surface R and the central curvature radius R of the image side surface of the first lens L1 to the optical filter GF constituting the camera optical lens 10 in the Embodiment 1 of the present invention, the on-axis thickness of each lens, the distance d between adjacent lenses, refractive index nd and abbe number vd. It should be noted that R and d are both in unit of millimeter (mm).

TABLE 1

| | R | d | | nd | | vd |
|---|---|---|---|---|---|---|
| S1 | ∞ | d0= | −0.505 | | | |
| R1 | 2.329 | d1= | 0.685 | nd1 | 1.6700 | v1 | 19.39 |
| R2 | 3.277 | d2= | 0.440 | | | |
| R3 | 3.325 | d3= | 0.565 | nd2 | 1.6700 | v2 | 19.39 |
| R4 | 5.842 | d4= | 0.648 | | | |
| R5 | 5.902 | d5= | 0.434 | nd3 | 1.6700 | v3 | 19.39 |
| R6 | 6.494 | d6= | 0.304 | | | |
| R7 | 4.312 | d7= | 0.571 | nd4 | 1.6700 | v4 | 19.39 |
| R8 | −3.533 | d8= | 0.204 | | | |
| R9 | 7.127 | d9= | 0.443 | nd5 | 1.6610 | v5 | 20.53 |
| R10 | 1.476 | d10= | 0.650 | | | |
| R11 | ∞ | d11= | 0.210 | ndg | 1.5168 | vg | 64.17 |
| R12 | ∞ | d12= | 0.129 | | | |

In the table, meanings of various symbols are defined as follows.

S1: aperture;
R: central curvature radius of an optical surface;
R1: central curvature radius of the object side surface of the first lens L1;
R2: central curvature radius of the image side surface of the first lens L1;
R3: central curvature radius of the object side surface of the second lens L2;
R4: central curvature radius of the image side surface of the second lens L2;
R5: central curvature radius of the object side surface of the third lens L3;
R6: central curvature radius of the image side surface of the third lens L3;
R7: central curvature radius of the object side surface of the fourth lens L4;
R8: central curvature radius of the image side surface of the fourth lens L4;
R9: central curvature radius of the object side surface of the fifth lens L5;
R10: central curvature radius of the image side surface of the fifth lens L5;
R11: central curvature radius of an object side surface of the optical filter GF;
R12: central curvature radius of an image side surface of the optical filter GF;
d: on-axis thickness of a lens, an on-axis distance between lenses;
d0: on-axis distance from the aperture S1 to the object side surface of the first lens L1;
d1: on-axis thickness of the first lens L1;
d2: on-axis distance from the image side surface of the first lens L1 to the object side surface of the second lens L2;
d3: on-axis thickness of the second lens L2;
d4: on-axis distance from the image side surface of the second lens L2 to the object side surface of the third lens L3;
d5: on-axis thickness of the third lens L3;
d6: on-axis distance from the image side surface of the third lens L3 to the object side surface of the fourth lens L4;
d7: on-axis thickness of the fourth lens L4;
d8: on-axis distance from the image side surface of the fourth lens L4 to the object side surface of the fifth lens L5;
d9: on-axis thickness of the fifth lens L5;
d10: on-axis distance from the image side surface of the fifth lens L5 to the object side surface of the optical filter GF;
d11: on-axis thickness of the optical filter GF;
d12: on-axis distance from the image side surface of the optical filter GF to the image plane;
nd: refractive index of d line;
nd1: refractive index of d line of the first lens L1;
nd2: refractive index of d line of the second lens L2;
nd3: refractive index of d line of the third lens L3;
nd4: refractive index of d line of the fourth lens L4;
nd5: refractive index of d line of the fifth lens L5;
ndg: refractive index of d line of the optical filter GF;
vd: abbe number;
v1: abbe number of the first lens L1;
v2: abbe number of the second lens L2;
v3: abbe number of the third lens L3;
v4: abbe number of the fourth lens L4;
v5: abbe number of the fifth lens L5;
vg: abbe number of the optical filter GF.

Table 2 shows aspheric surface data of respective lenses in the camera optical lens 10 according to Embodiment 1 of the present invention.

TABLE 2

| | Cone coefficient | Aspherical coefficient | | | | |
|---|---|---|---|---|---|---|
| | k | A4 | A6 | A8 | A10 | A12 |
| R1 | −1.1400E+00 | 1.1058E−02 | −1.2177E−02 | 9.8721E−03 | −3.9683E−03 | 5.8783E−05 |
| R2 | −2.6095E+00 | −3.1551E−03 | −1.3209E−02 | 1.4902E−02 | −1.4793E−02 | 6.5852E−03 |
| R3 | 2.2389E+00 | −4.2770E−02 | 4.0634E−02 | −8.2563E−02 | 7.1442E−02 | −3.8943E−02 |

TABLE 2-continued

| | | | | | |
|---|---|---|---|---|---|
| R4 | 9.0381E+00 | −5.7508E−03 | −2.5890E−02 | 2.2554E−02 | −2.1370E−02 | 8.3321E−03 |
| R5 | −4.2368E+01 | −4.5770E−02 | 5.4229E−02 | −6.6095E−02 | 5.8997E−02 | −3.2744E−02 |
| R6 | −7.2165E+01 | −3.2271E−02 | −6.4214E−02 | 7.1100E−02 | −3.5060E−02 | 8.7521E−03 |
| R7 | −1.2263E+01 | 1.0499E−01 | −1.0628E−01 | 5.7294E−02 | −2.2458E−02 | 3.7672E−03 |
| R8 | −1.2444E+01 | 1.6195E−01 | −9.5446E−02 | 3.0007E−02 | −9.6681E−03 | 2.4612E−03 |
| R9 | 4.4834E+00 | −1.2469E−01 | 7.0832E−03 | 1.5869E−02 | −5.7157E−03 | 8.8929E−04 |
| R10 | −6.5893E+00 | −7.8870E−02 | 2.4393E−02 | −3.8148E−03 | 1.8801E−04 | 1.7904E−05 |

| | Cone coefficient | Aspherical coefficient | | | |
|---|---|---|---|---|---|
| | k | A14 | A16 | A18 | A20 |
| R1 | −1.1400E+00 | 3.0821E−04 | −6.4201E−05 | 0.0000E+00 | 0.0000E+00 |
| R2 | −2.6095E+00 | −1.4789E−03 | 1.4030E−04 | 0.0000E+00 | 0.0000E+00 |
| R3 | 2.2389E+00 | 1.1302E−02 | −1.2859E−03 | 0.0000E+00 | 0.0000E+00 |
| R4 | 9.0381E+00 | −1.2254E−03 | 3.2051E−05 | 0.0000E+00 | 0.0000E+00 |
| R5 | −4.2368E+01 | 9.0818E−03 | −9.8023E−04 | 0.0000E+00 | 0.0000E+00 |
| R6 | −7.2165E+01 | −1.1751E−03 | 9.2243E−05 | 0.0000E+00 | 0.0000E+00 |
| R7 | −1.2263E+01 | −3.7273E−05 | −3.0183E−05 | 0.0000E+00 | 0.0000E+00 |
| R8 | −1.2444E+01 | −3.2746E−04 | 1.6568E−05 | 0.0000E+00 | 0.0000E+00 |
| R9 | 4.4834E+00 | −6.7757E−05 | 2.0568E−06 | 0.0000E+00 | 0.0000E+00 |
| R10 | −6.5893E+00 | −2.3224E−06 | 6.4885E−08 | 0.0000E+00 | 0.0000E+00 |

In Table 2, k represents a cone coefficient, and A4, A6, A8, A10, A12, A14, A16, A18, and A20 represent aspherical coefficients.

$$y=(x^2/R)/\{1+[1-(k+1)(x^2/R^2)]^{1/2}\}+A4x^4+A6x^6+A8x^8+A10x^{10}+A12x^{12}+A14x^{14}+A16x^{16}+A18x^{18}+A20x^{20} \quad (4)$$

In the equation (4), x represents a vertical distance between a point on an aspherical curve and the optic axis, and y represents an aspherical depth (a vertical distance between a point on an aspherical surface, having a distance of x from the optic axis, and a surface tangent to a vertex of the aspherical surface on the optic axis).

For convenience, an aspherical surface of each lens surface uses the aspherical surfaces shown in the above equation (4). However, the present invention is not limited to the aspherical polynomial form shown in the equation (4).

Table 3 and Table 4 show design data of inflection points and stagnation points of respective lenses in the camera optical lens 10 of this embodiment. P1R1 and P1R2 represent the object side surface and the image side surface of the first lens L1, respectively; P2R1 and P2R2 represent the object side surface and the image side surface of the second lens L2, respectively; P3R1 and P3R2 represent the object side surface and the image side surface of the third lens L3, respectively; P4R1 and P4R2 represent the object side surface and the image side surface of the fourth lens L4, respectively; and P5R1 and P5R2 represent the object side surface and the image side surface of the fifth lens L5, respectively. The data in the column "inflection point position" refers to a vertical distance from an inflection point arranged on each lens surface to the optic axis of the camera optical lens 10. The data in the column "stagnation point position" refers to a vertical distance from a stagnation point arranged on each lens surface to the optic axis of the camera optical lens 10.

TABLE 3

| | Number of inflection points | Inflection point position 1 | Inflection point position 2 | Inflection point position 3 | Inflection point position 4 |
|---|---|---|---|---|---|
| P1R1 | 1 | 1.365 | / | / | / |
| P1R2 | 1 | 0.965 | / | / | / |
| P2R1 | 1 | 0.825 | / | / | / |
| P2R2 | 1 | 0.785 | / | / | / |
| P3R1 | 1 | 0.625 | / | / | / |
| P3R2 | 2 | 0.415 | 1.585 | / | / |
| P4R1 | 2 | 0.935 | 1.815 | / | / |
| P4R2 | 4 | 0.395 | 1.035 | 1.905 | 2.155 |
| P5R1 | 3 | 0.315 | 1.435 | 2.525 | / |
| P5R2 | 1 | 0.605 | / | / | / |

TABLE 4

| | Number of stagnation points | Stagnation point position 1 | Stagnation point position 2 |
|---|---|---|---|
| P1R1 | 0 | / | / |
| PIR2 | 1 | 1.415 | / |
| P2R1 | 1 | 1.205 | / |
| P2R2 | 1 | 1.145 | / |
| P3R1 | 1 | 1.135 | / |
| P3R2 | 2 | 0.715 | 1.755 |
| P4R1 | 1 | 1.325 | / |
| P4R2 | 2 | 0.785 | 1.215 |
| P5R1 | 2 | 0.545 | 2.165 |
| P5R2 | 1 | 1.505 | / |

Table 13 below lists various values corresponding to parameters which are specified in the above conditions for each of Embodiments 1, 2 and 3.

As shown in Table 3, Embodiment 1 satisfies the conditions.

Figure 2:
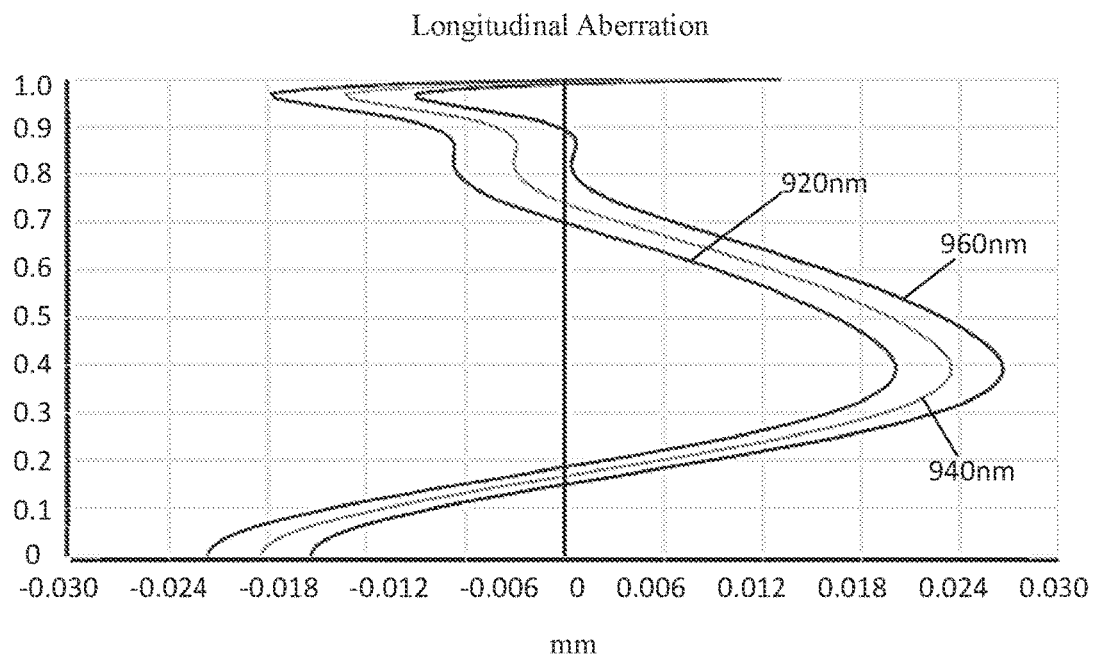
FIG. 2 is a schematic diagram of a longitudinal aberration of the camera optical lens shown in FIG. 1.
Figure 3:
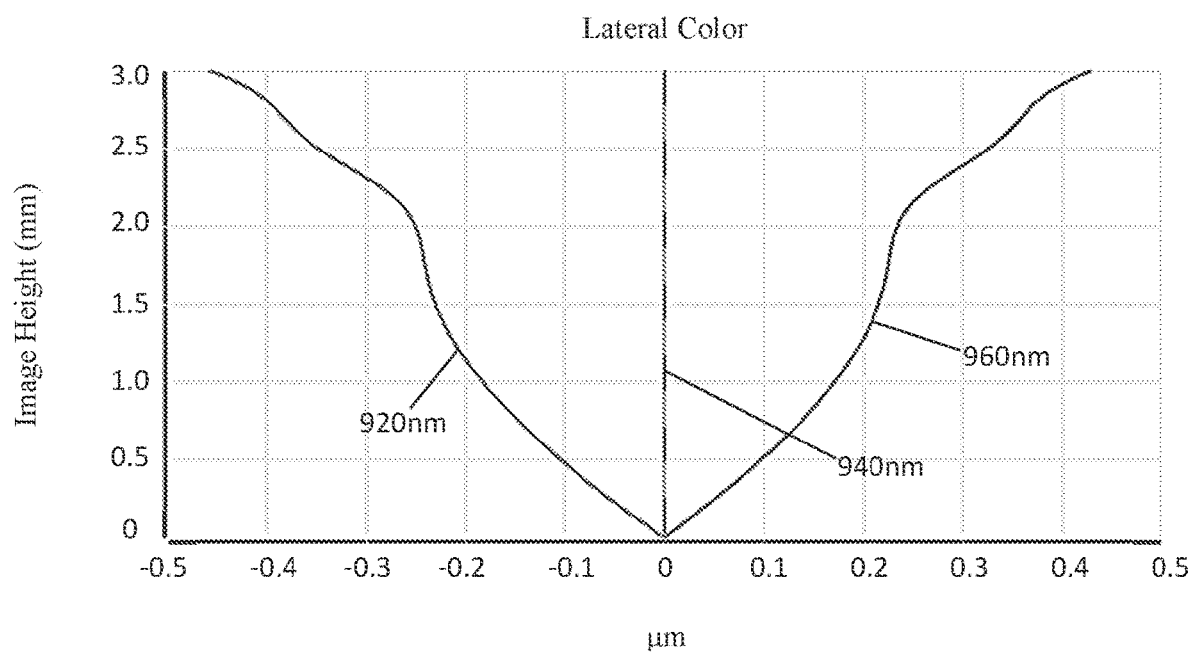
FIG. 3 is a schematic diagram of a lateral color of the camera optical lens shown in FIG. 1.
Figure 4:
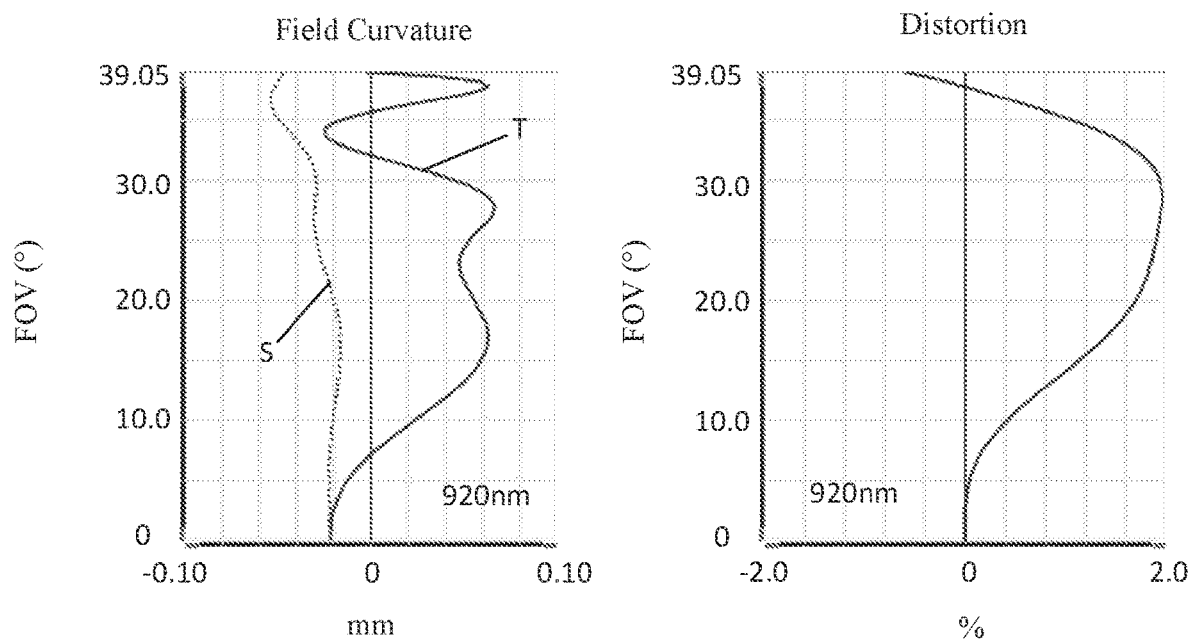
FIG. 4 is a schematic diagram of a field curvature and a distortion of the camera optical lens shown in FIG. 1.

FIG. 2 and FIG. 3 illustrate a longitudinal aberration and a lateral color of light with wavelengths of 920 nm, 940 nm, and 960 nm after passing the camera optical lens 10. FIG. 4 illustrates a field curvature and a distortion of light with a wavelength of 920 nm after passing the camera optical lens 10, in which a field curvature S is a field curvature in a sagittal direction and T is a field curvature in a meridian direction.

In this embodiment, the entrance pupil diameter ENPD of the camera optical lens 10 is 3.246 mm. The full field of view image height IH is 3.000 mm. The field of view (FOV) along a diagonal direction is 78.10°. Thus, the camera optical lens 10 satisfies requirements of ultra-thinness, a large aperture, and a wide angle while having on-axis and off-axis aberrations sufficiently corrected, thereby leading to better optical characteristics.

Embodiment 2

Figure 5:
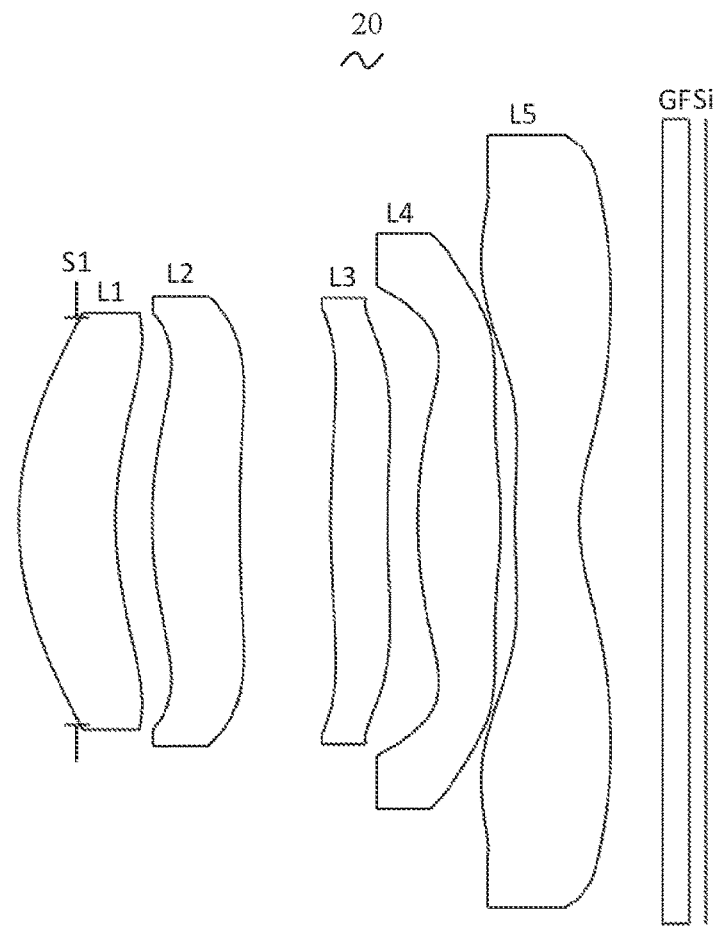
FIG. 5 is a schematic structural diagram of a camera optical lens in accordance with Embodiment 2 of the present invention.

FIG. 5 is a structural schematic diagram of the camera optical lens 20 in Embodiment 2. Embodiment 2 is basically the same as Embodiment 1 and involves symbols having the same meanings as Embodiment 1, and the same portions will not be repeated. Only differences from Embodiment 1 will be described in the following.

In this embodiment, the third lens L3 has a negative refractive power.

Table 5 and Table 6 show design data of a camera optical lens 20 in Embodiment 2 of the present invention.

TABLE 5

|     | R        | d        |       | nd     |     | vd    |
|-----|----------|----------|-------|--------|-----|-------|
| S1  | ∞        | d0=      | −0.456|        |     |       |
| R1  | 2.499    | d1=      | 0.759 | nd1    | 1.6700 | v1 | 19.39 |
| R2  | 3.028    | d2=      | 0.287 |        |     |       |
| R3  | 3.260    | d3=      | 0.688 | nd2    | 1.6700 | v2 | 19.39 |
| R4  | 10.334   | d4=      | 0.719 |        |     |       |
| R5  | 7.300    | d5=      | 0.443 | nd3    | 1.6700 | v3 | 19.39 |
| R6  | 7.100    | d6=      | 0.241 |        |     |       |
| R7  | 4.779    | d7=      | 0.652 | nd4    | 1.6700 | v4 | 19.39 |
| R8  | −3.298   | d8=      | 0.112 |        |     |       |
| R9  | 5.912    | d9=      | 0.506 | nd5    | 1.6610 | v5 | 20.53 |
| R10 | 1.458    | d10=     | 0.653 |        |     |       |
| R11 | ∞        | d11=     | 0.210 | ndg    | 1.5168 | vg | 64.17 |
| R12 | ∞        | d12=     | 0.132 |        |     |       |

Table 6 shows aspherical surface data of respective lenses in the camera optical lens 20 according to Embodiment 2 of the present invention.

TABLE 6

| | Cone coefficient | Aspherical coefficient | | | | |
|---|---|---|---|---|---|---|
| | k | A4 | A6 | A8 | A10 | A12 |
| R1 | −1.2912E+00 | 8.3417E−03 | −1.3031E−02 | 9.8548E−03 | −3.5723E−03 | 6.1861E−05 |
| R2 | −3.2530E+00 | −2.8684E−03 | −1.6759E−02 | 1.5930E−02 | −1.4382E−02 | 6.5175E−03 |
| R3 | 1.5303E+00 | −4.0553E−02 | 4.0334E−02 | −8.0039E−02 | 7.1117E−02 | −3.9015E−02 |
| R4 | 2.9908E+01 | 1.7606E−03 | −3.0894E−02 | 2.5591E−02 | −2.0474E−02 | 8.0542E−03 |
| R5 | −1.6443E+01 | −4.3199E−02 | 4.8368E−02 | −6.5344E−02 | 5.9254E−02 | −3.2606E−02 |
| R6 | 4.3042E+00 | −3.6184E−02 | −6.5598E−02 | 6.9247E−02 | −3.4997E−02 | 8.9875E−03 |
| R7 | −9.4570E+00 | 9.6742E−02 | −1.0311E−01 | 5.6353E−02 | −2.2871E−02 | 3.7236E−03 |
| R8 | −7.3920E+00 | 1.6189E−01 | −9.5123E−02 | 3.0074E−02 | −9.6652E−03 | 2.4582E−03 |
| R9 | 2.4054E+00 | −1.2225E−01 | 7.0964E−03 | 1.5815E−02 | −5.7264E−03 | 8.8940E−04 |
| R10 | −6.2411E+00 | −7.5450E−02 | 2.4332E−02 | −3.8280E−03 | 1.8924E−04 | 1.8406E−05 |
| | Cone coefficient | Aspherical coefficient | | | | |
| | k | A14 | A16 | A18 | A20 | |
| R1 | −1.2912E+00 | 2.4506E−04 | −4.3749E−05 | 0.0000E+00 | 0.0000E+00 | |
| R2 | −3.2530E+00 | −1.5350E−03 | 1.5876E−04 | 0.0000E+00 | 0.0000E+00 | |
| R3 | 1.5303E+00 | 1.1346E−02 | −1.3159E−03 | 0.0000E+00 | 0.0000E+00 | |
| R4 | 2.9908E+01 | −1.4089E−03 | 7.7924E−05 | 0.0000E+00 | 0.0000E+00 | |
| R5 | −1.6443E+01 | 9.1559E−03 | −9.9884E−04 | 0.0000E+00 | 0.0000E+00 | |
| R6 | 4.3042E+00 | −1.0501E−03 | 5.0391E−05 | 0.0000E+00 | 0.0000E+00 | |
| R7 | −9.4570E+00 | 4.5133E−05 | −4.4479E−05 | 0.0000E+00 | 0.0000E+00 | |
| R8 | −7.3920E+00 | −3.2634E−04 | 1.6190E−05 | 0.0000E+00 | 0.0000E+00 | |
| R9 | 2.4054E+00 | −6.7075E−05 | 1.9877E−06 | 0.0000E+00 | 0.0000E+00 | |
| R10 | −6.2411E+00 | −2.2642E−06 | 5.2404E−08 | 0.0000E+00 | 0.0000E+00 | |

Table 7 and Table 8 show design data of inflection points and stagnation points of respective lenses in the camera optical lens 20.

TABLE 7

|  | Number of inflection points | Inflection point position 1 | Inflection point position 2 | Inflection point position 3 |
|---|---|---|---|---|
| P1R1 | 1 | 1.435 | / | / |
| P1R2 | 2 | 0.945 | 1.635 | / |
| P2R1 | 1 | 0.845 | / | / |
| P2R2 | 1 | 0.705 | / | / |
| P3R1 | 1 | 0.655 | / | / |
| P3R2 | 2 | 0.465 | 1.515 | / |
| P4R1 | 1 | 0.915 | / | / |
| P4R2 | 2 | 0.425 | 1.015 | / |
| P5R1 | 3 | 0.355 | 1.405 | 2.415 |
| P5R2 | 1 | 0.625 | / | / |

TABLE 8

|  | Number of stagnation points | Stagnation point position 1 | Stagnation point position 2 | Stagnation point position 3 |
|---|---|---|---|---|
| P1R1 | 0 | / | / | / |
| P1R2 | 1 | 1.435 | / | / |
| P2R1 | 1 | 1.245 | / | / |
| P2R2 | 1 | 1.045 | / | / |
| P3R1 | 1 | 1.115 | / | / |
| P3R2 | 2 | 0.775 | 1.715 | / |
| P4R1 | 1 | 1.275 | / | / |
| P4R2 | 2 | 0.925 | 1.085 | / |
| P5R1 | 3 | 0.615 | 2.055 | 2.605 |
| P5R2 | 1 | 1.765 | / | / |

Table 13 below lists various values corresponding to parameters which are specified in the above conditions for Embodiment 2. It can be seen that the camera optical lens of this embodiment satisfies the various conditions.

Figure 6:
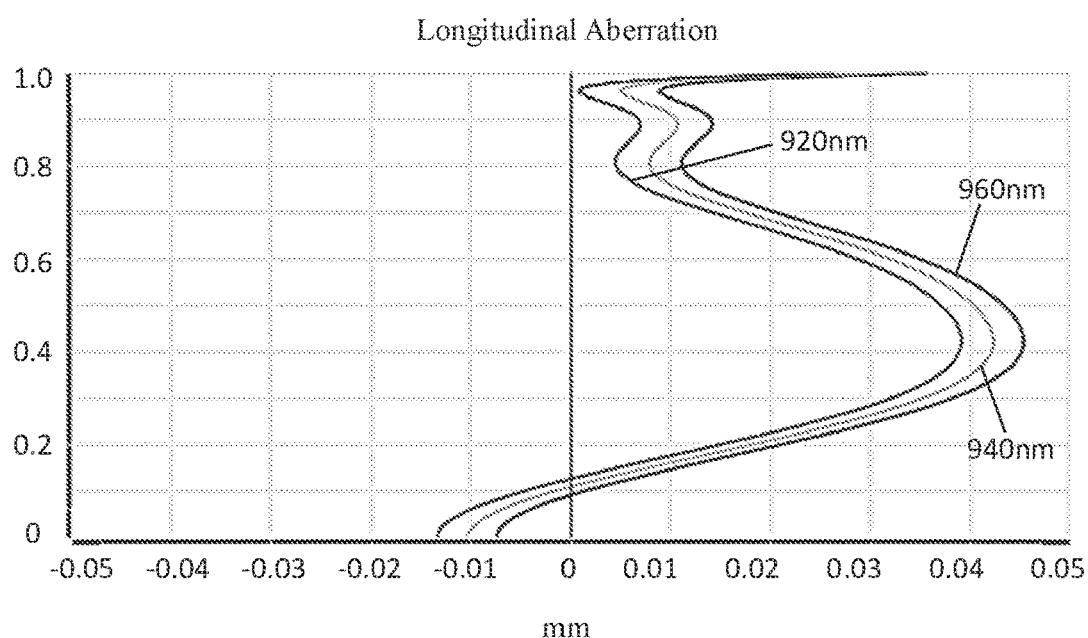
FIG. 6 is a schematic diagram of a longitudinal aberration of the camera optical lens shown in FIG. 5.
Figure 7:
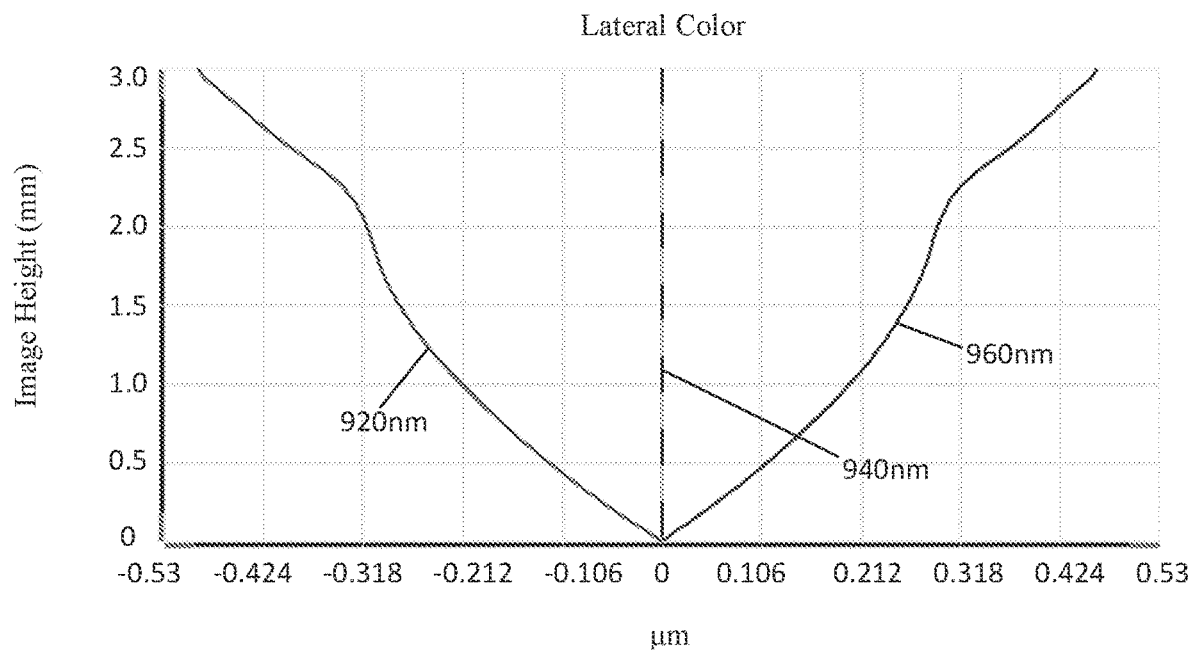
FIG. 7 is a schematic diagram of a lateral color of the camera optical lens shown in FIG. 5.
Figure 8:
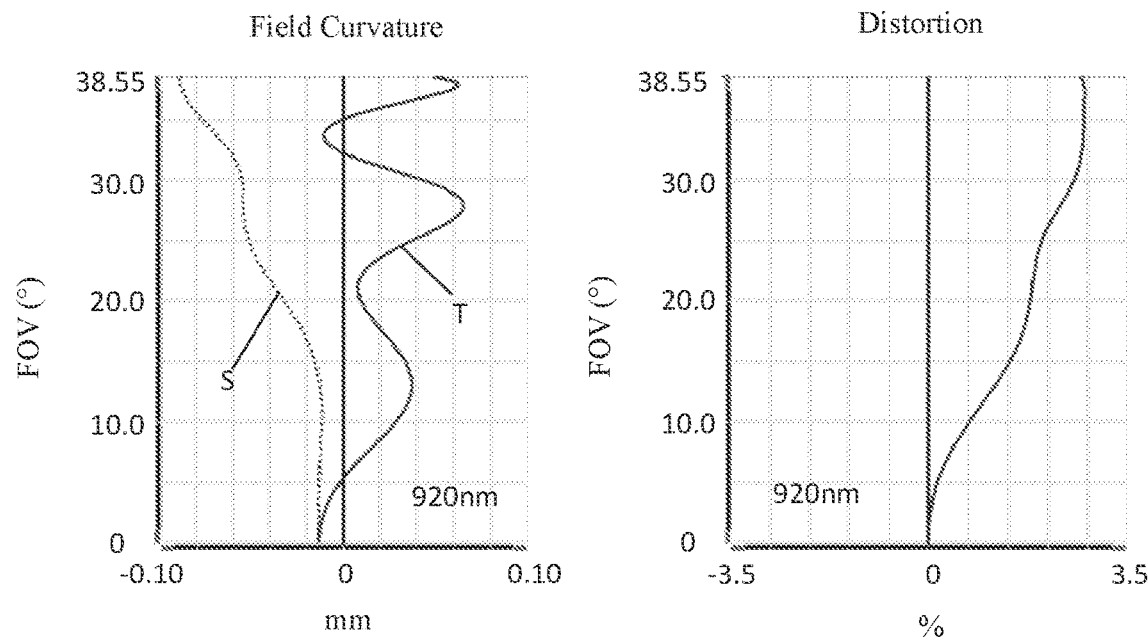
FIG. 8 is a schematic diagram of a field curvature and a distortion of the camera optical lens shown in FIG. 5.

FIG. 6 and FIG. 7 illustrate a longitudinal aberration and a lateral color of light with wavelengths of 920 nm, 940 nm, and 960 nm after passing the camera optical lens 20. FIG. 8 illustrates a field curvature and a distortion of light with a wavelength of 920 nm after passing the camera optical lens 20, in which a field curvature S is a field curvature in a sagittal direction and T is a field curvature in a meridian direction.

In this embodiment, the entrance pupil diameter ENPD of the camera optical lens 20 is 3.209 mm. The full field of view image height IH is 3.000 mm. The field of view (FOV) along a diagonal direction is 77.10°. Thus, the camera optical lens 20 can satisfy requirements of ultra-thin, large-aperture, wide-angle design while having on-axis and off-axis aberrations sufficiently corrected, thereby leading to better optical characteristics.

Embodiment 3

Figure 9:
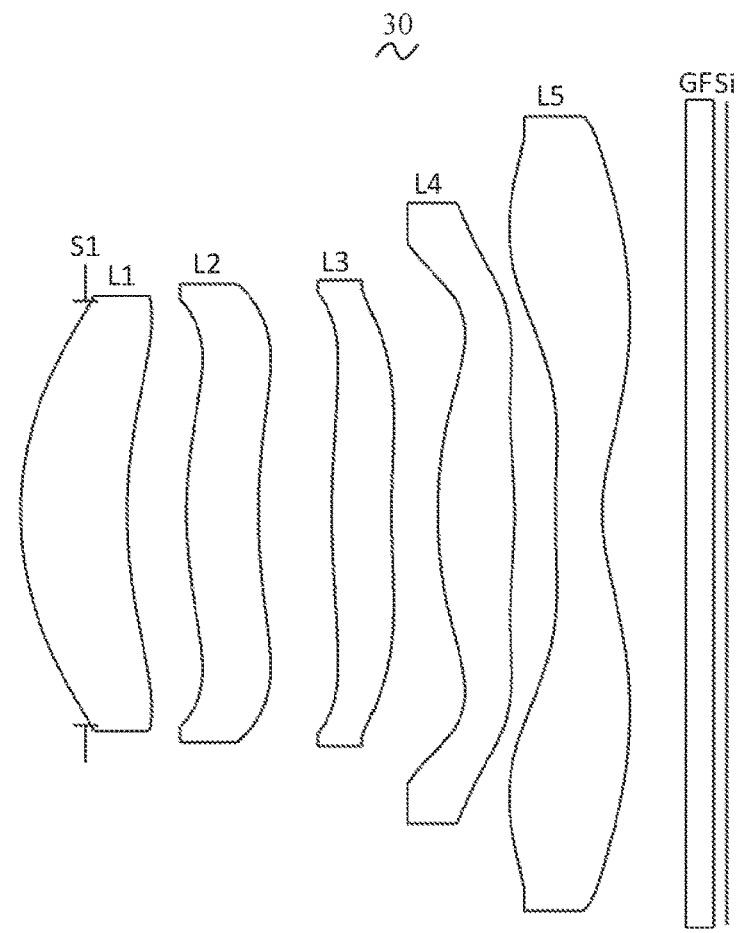
FIG. 9 is a schematic structural diagram of a camera optical lens in accordance with Embodiment 3 of the present invention.

FIG. 9 is a structural schematic diagram of the camera optical lens 30 in Embodiment 3. Embodiment 3 is basically the same as Embodiment 1 and involves symbols having the same meanings as Embodiment 1, and the same portions will not be repeated. Only differences from Embodiment 1 will be described in the following.

Table 9 and Table 10 show design data of a camera optical lens 30 in Embodiment 3 of the present invention.

TABLE 9

|  | R | d |  | nd |  | vd |
|---|---|---|---|---|---|---|
| S1 | ∞ | d0= | −0.485 |  |  |  |
| R1 | 2.432 | d1= | 0.798 | nd1 | 1.6700 | v1 | 19.39 |
| R2 | 3.712 | d2= | 0.446 |  |  |  |
| R3 | 3.351 | d3= | 0.544 | nd2 | 1.6700 | v2 | 19.39 |
| R4 | 4.667 | d4= | 0.553 |  |  |  |
| R5 | 5.697 | d5= | 0.445 | nd3 | 1.6700 | v3 | 19.39 |
| R6 | 6.788 | d6= | 0.351 |  |  |  |
| R7 | 4.000 | d7= | 0.579 | nd4 | 1.6700 | v4 | 19.39 |
| R8 | −3.557 | d8= | 0.304 |  |  |  |
| R9 | 6.809 | d9= | 0.353 | nd5 | 1.6610 | v5 | 20.53 |
| R10 | 1.519 | d10= | 0.626 |  |  |  |
| R11 | ∞ | d11= | 0.210 | ndg | 1.5168 | vg | 64.17 |
| R12 | ∞ | d12= | 0.102 |  |  |  |

Table 10 shows aspheric surface data of respective lenses in the camera optical lens 30 according to Embodiment 3 of the present invention.

TABLE 10

|  | Cone coefficient | Aspherical coefficient | | | | |
|---|---|---|---|---|---|---|
|  | k | A4 | A6 | A8 | A10 | A12 |
| R1 | −1.2006E+00 | 1.0746E−02 | −1.1166E−02 | 9.9811E−03 | −3.9141E−03 | 8.1967E−05 |
| R2 | −3.6001E+00 | −4.3220E−03 | −1.2089E−02 | 1.6143E−02 | −1.4586E−02 | 6.5019E−03 |
| R3 | 1.8907E+00 | −5.0101E−02 | 4.0545E−02 | −8.1734E−02 | 7.1760E−02 | −3.8870E−02 |
| R4 | 5.6093E+00 | −1.5549E−02 | −2.7160E−02 | 2.3664E−02 | −2.1316E−02 | 8.2081E−03 |
| R5 | −4.8852E+01 | −4.5632E−02 | 5.4369E−02 | −6.6071E−02 | 5.8972E−02 | −3.2755E−02 |
| R6 | −9.4987E+01 | −3.3965E−02 | −6.4514E−02 | 7.1251E−02 | −3.4942E−02 | 8.7917E−03 |
| R7 | −1.5877E+01 | 1.0782E−01 | −1.0581E−01 | 5.7438E−02 | −2.2413E−02 | 3.7779E−03 |
| R8 | −1.0995E+01 | 1.6281E−01 | −9.5325E−02 | 3.0013E−02 | −9.6674E−03 | 2.4610E−03 |
| R9 | 3.6868E+00 | −1.2496E−01 | 7.0187E−03 | 1.5869E−02 | −5.7146E−03 | 8.8957E−04 |
| R10 | −6.6480E+00 | −7.9355E−02 | 2.4428E−02 | −3.8041E−03 | 1.9182E−04 | 1.8076E−05 |

|  | Cone coefficient | Aspherical coefficient | | | |
|---|---|---|---|---|---|
|  | k | A14 | A16 | A18 | A20 |
| R1 | −1.2006E+00 | 3.1371E−04 | −6.3328E−05 | 0.0000E+00 | 0.0000E+00 |
| R2 | −3.6001E+00 | −1.5208E−03 | 1.4771E−04 | 0.0000E+00 | 0.0000E+00 |
| R3 | 1.8907E+00 | 1.1285E−02 | −1.3249E−03 | 0.0000E+00 | 0.0000E+00 |
| R4 | 5.6093E+00 | −1.2671E−03 | 4.0193E−05 | 0.0000E+00 | 0.0000E+00 |
| R5 | −4.8852E+01 | 9.0865E−03 | −9.7091E−04 | 0.0000E+00 | 0.0000E+00 |
| R6 | −9.4987E+01 | −1.1720E−03 | 8.8480E−05 | 0.0000E+00 | 0.0000E+00 |

TABLE 10-continued

| R7  | −1.5877E+01 | −3.7286E−05 | −3.1826E−05 | 0.0000E+00 | 0.0000E+00 |
| R8  | −1.0995E+01 | −3.2755E−04 | 1.6592E−05  | 0.0000E+00 | 0.0000E+00 |
| R9  | 3.6868E+00  | −6.7713E−05 | 2.0514E−06  | 0.0000E+00 | 0.0000E+00 |
| R10 | −6.6480E+00 | −2.3343E−06 | 6.1528E−08  | 0.0000E+00 |            |

Table 11 and Table 12 show design data of inflection points and stagnation points of respective lenses in the camera optical lens 30.

TABLE 11

|      | Number of inflection points | Inflection point position 1 | Inflection point position 2 | Inflection point position 3 | Inflection point position 4 |
|------|---|-------|-------|-------|-------|
| P1R1 | 1 | 1.485 | /     | /     | /     |
| P1R2 | 1 | 1.005 | /     | /     | /     |
| P2R1 | 1 | 0.775 | /     | /     | /     |
| P2R2 | 1 | 0.775 | /     | /     | /     |
| P3R1 | 1 | 0.605 | /     | /     | /     |
| P3R2 | 2 | 0.405 | 1.545 | /     | /     |
| P4R1 | 3 | 0.955 | 1.825 | 2.035 | /     |
| P4R2 | 4 | 0.395 | 1.035 | 1.885 | 2.185 |
| P5R1 | 4 | 0.325 | 1.435 | 2.605 | 2.775 |
| P5R2 | 1 | 0.605 | /     | /     | /     |

TABLE 12

|      | Number of stagnation points | Stagnation point position 1 | Stagnation point position 2 |
|------|---|-------|-------|
| P1R1 | 0 | /     | /     |
| P1R2 | 1 | 1.475 | /     |
| P2R1 | 1 | 1.175 | /     |
| P2R2 | 1 | 1.155 | /     |
| P3R1 | 1 | 1.135 | /     |
| P3R2 | 2 | 0.685 | 1.725 |
| P4R1 | 1 | 1.345 | /     |
| P4R2 | 2 | 0.795 | 1.215 |
| P5R1 | 2 | 0.565 | 2.155 |
| P5R2 | 1 | 1.485 | /     |

Table 13 below lists various values corresponding to parameters which are specified in the above conditions for Embodiment 3. It can be seen that the camera optical lens of this embodiment satisfies the various conditions.

Figure 10:
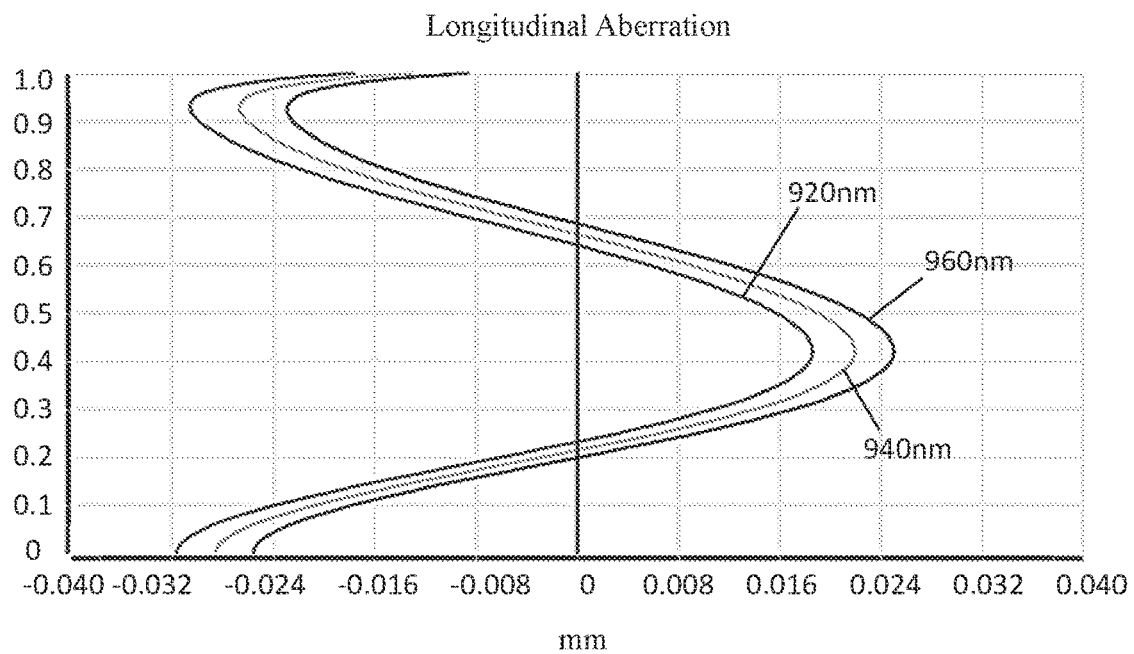
FIG. 10 is a schematic diagram of a longitudinal aberration of the camera optical lens shown in FIG. 9.
Figure 11:
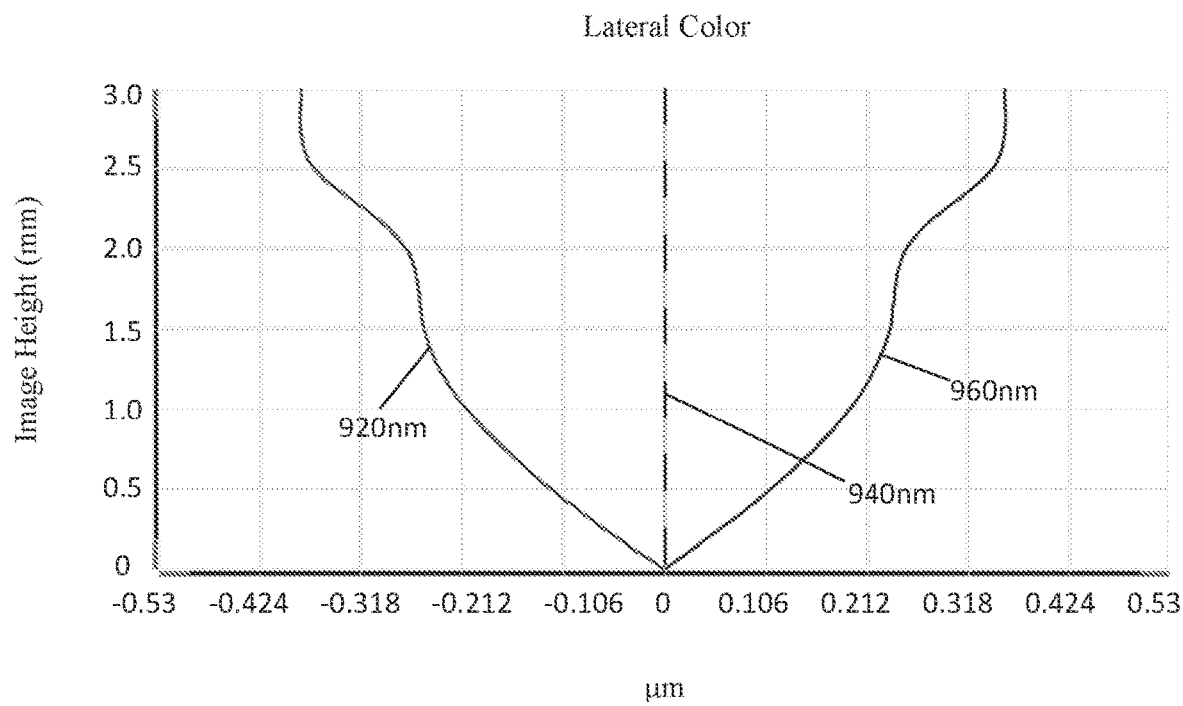
FIG. 11 is a schematic diagram of a lateral color of the camera optical lens shown in FIG. 9.
Figure 12:
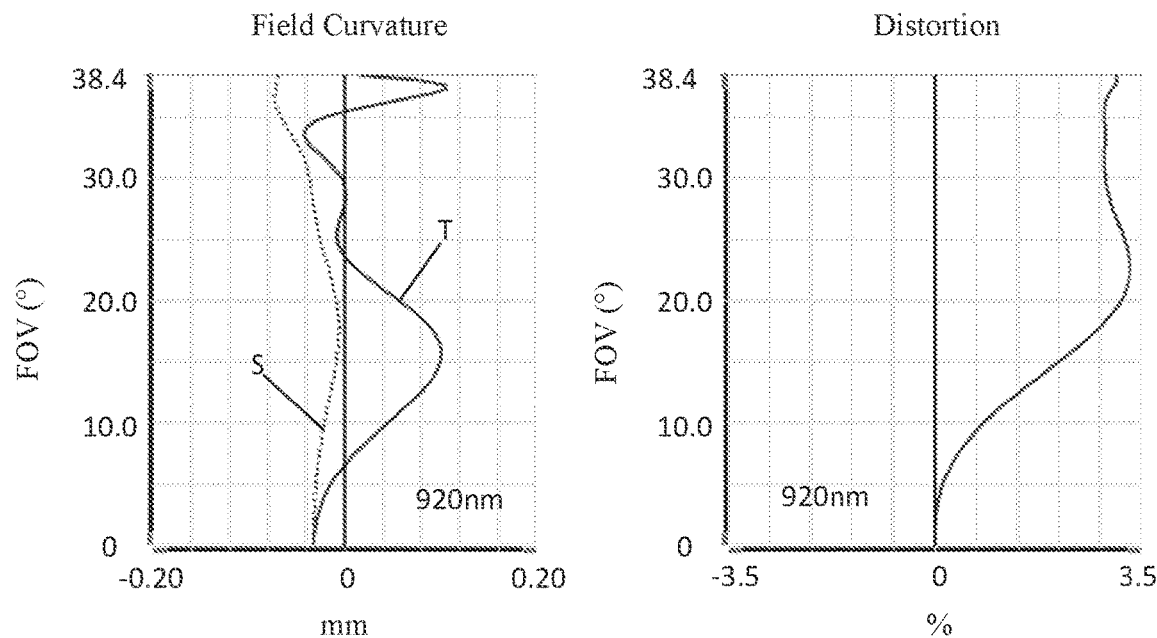
FIG. 12 is a schematic diagram of a field curvature and a distortion of the camera optical lens shown in FIG. 9.

FIG. 10 and FIG. 11 illustrate a longitudinal aberration and a lateral color of light with wavelengths of 920 nm, 940 nm, and 960 nm after passing the camera optical lens 30. FIG. 12 illustrates a field curvature and a distortion of light with a wavelength of 920 nm after passing the camera optical lens 30, in which a field curvature S is a field curvature in a sagittal direction and T is a field curvature in a meridian direction.

In this embodiment, the entrance pupil diameter ENPD of the camera optical lens 30 is 3.192 mm. The full field of view image height IH is 3.000 mm. The field of view (FOV) along a diagonal direction is 76.87°. Thus, the camera optical lens 30 can satisfy requirements of ultra-thin, large-aperture, wide-angle design while having on-axis and off-axis aberrations sufficiently corrected, thereby leading to better optical characteristics.

TABLE 13

| Parameters and Conditions | Embodiment 1 | Embodiment 2 | Embodiment 3 |
|---|---|---|---|
| f1/f  | 2.67   | 3.93      | 2.45    |
| d4/d6 | 2.13   | 2.98      | 1.58    |
| d8/d9 | 0.46   | 0.22      | 0.86    |
| f     | 3.668  | 3.627     | 3.607   |
| f1    | 9.774  | 14.266    | 8.830   |
| f2    | 11.043 | 7.144     | 15.935  |
| f3    | 78.295 | −2999.000 | 47.605  |
| f4    | 3.112  | 3.137     | 3.022   |
| f5    | −3.024 | −3.189    | −3.161  |
| FNO   | 1.13   | 1.13      | 1.13    |
| TTL   | 5.283  | 5.402     | 5.311   |
| FOV   | 78.10° | 77.10°    | 76.87°  |
| IH    | 3.000  | 3.000     | 3.000   |

The above are only the embodiments of the present invention. It should be pointed out here that for those of ordinary skill in the art, improvements can be made without departing from the inventive concept of the present invention, but these all belong to the scope of the present invention.

What is claimed is:

1. A camera optical lens, comprising, from an object side to an image side:
   a first lens having a positive refractive power;
   a second lens having a positive refractive power;
   a third lens;
   a fourth lens having a positive refractive power; and
   a fifth lens having a negative refractive power,
   wherein the camera optical lens satisfies following conditions:

$2.10 \leq f1/f \leq 4.00$;

$1.00 \leq d4/d6 \leq 3.00$; and $0.20 \leq d8/d9 \leq 0.90$, where
   f denotes a focal length of the camera optical lens;
   f1 denotes a focal length of the first lens;
   d4 denotes an on-axis distance from an image side surface of the second lens to an object side surface of the third lens;
   d6 denotes an on-axis distance from an image side surface of the third lens to an object side surface of the fourth lens;
   d8 denotes an on-axis distance from an image side surface of the fourth lens to an object side surface of the fifth lens; and
   d9 denotes an on-axis thickness of the fifth lens.

2. The camera optical lens as described in claim 1, further satisfying a following condition:

$0.30 \leq R3/R4 \leq 0.80$, where
   R3 denotes a central curvature radius of an object side surface of the second lens; and
   R4 denotes a central curvature radius of the image side surface of the second lens.

3. The camera optical lens as described in claim 1, further satisfying following conditions:

$$-20.90 \leq (R1+R2)/(R1-R2) \leq -3.20; \text{ and}$$

$$0.06 \leq d1/TTL \leq 0.23,$$

where
- R1 denotes a central curvature radius of an object side surface of the first lens;
- R2 denotes a central curvature radius of an image side surface of the first lens;
- d1 denotes an on-axis thickness of the first lens; and
- TTL denotes a total optical length from the object side surface of the first lens to an image plane of the camera optical lens along an optic axis.

4. The camera optical lens as described in claim 1, further satisfying following conditions:

$$0.98 \leq f2/f \leq 6.63;$$

$$-12.19 \leq (R3+R4)/(R3-R4) \leq -1.28; \text{ and}$$

$$0.05 \leq d3/TTL \leq 0.19,$$

where
- f2 denotes a focal length of the second lens;
- R3 denotes a central curvature radius of an object side surface of the second lens;
- R4 denotes a central curvature radius of the image side surface of the second lens;
- d3 denotes an on-axis thickness of the second lens; and
- TTL denotes a total optical length from an object side surface of the first lens to an image plane of the camera optical lens along an optic axis.

5. The camera optical lens as described in claim 1, further satisfying following conditions:

$$-1653.71 \leq f3/f \leq 32.02;$$

$$-41.88 \leq (R5+R6)/(R5-R6) \leq 108.00; \text{ and}$$

$$0.04 \leq d5/TTL \leq 0.13,$$

where
- f3 denotes a focal length of the third lens; and
- R5 denotes a central curvature radius of the object side surface of the third lens;
- R6 denotes a central curvature radius of the image side surface of the third lens;
- d5 denotes an on-axis thickness of the third lens; and
- TTL denotes a total optical length from an object side surface of the first lens to an image plane of the camera optical lens along an optic axis.

6. The camera optical lens as described in claim 1, further satisfying following conditions:

$$0.42 \leq f4/f \leq 1.30;$$

$$0.03 \leq (R7+R8)/(R7-R8) \leq 0.28; \text{ and}$$

$$0.05 \leq d7/TTL \leq 0.18,$$

where
- f4 denotes a focal length of fourth lens;
- R7 denotes a central curvature radius of the object side surface of the fourth lens;
- R8 denotes a central curvature radius of the image side surface of the fourth lens;
- d7 denotes an on-axis thickness of the fourth lens; and
- TTL denotes a total optical length from an object side surface of the first lens to an image plane of the camera optical lens along an optic axis.

7. The camera optical lens as described in claim 1, further satisfying following conditions:

$$-1.76 \leq f5/f \leq -0.55;$$

$$0.76 \leq (R9+R10)/(R9-R10) \leq 2.48; \text{ and}$$

$$0.03 \leq d9/TTL \leq 0.14,$$

where
- f5 denotes a focal length of the fifth lens;
- R9 denotes a central curvature radius of the object side surface of the fifth lens;
- R10 denotes a central curvature radius of an image side surface of the fifth lens; and
- TTL denotes a total optical length from an object side surface of the first lens to an image plane of the camera optical lens along an optic axis.

8. The camera optical lens as described in claim 1, further satisfying a following condition:

$$TTL/IH \leq 1.81,$$

where
- IH denotes an image height of the camera optical lens; and
- TTL denotes a total optical length from an object side surface of the first lens to an image plane of the camera optical lens along an optic axis.

9. The camera optical lens as described in claim 1, further satisfying a following condition:

$$FOV \geq 76.5°,$$

where FOV denotes a field of view of the camera optical lens.

10. The camera optical lens as described in claim 1, further satisfying a following condition:

$$FNO \leq 1.15,$$

where FNO denotes an F number of the camera optical lens.

11. The camera optical lens as described in claim 1, wherein the object side surface of the third lens is convex at a paraxial position.

* * * * *